UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 610,953, dated September 20, 1898.

Application filed March 7, 1898. Serial No. 672,810. (No specimens.)

*To all whom it may concern:*

Be it known that I, JOHN H. STEVENS, of the city of Newark, county of Essex, and State of New Jersey, have invented certain new and useful Improvements in Pyroxylin Compounds, of which improvements the following is a specification.

It is well known that pyroxylin, either in a pure state or when combined with solvents, is more or less liable to spontaneous decomposition with the elimination of acid and that this decomposition is often attended with danger, especially in cases where dry guncotton is stored or used. Attempts have been made to minimize this tendency by special treatment of the pyroxylin, but the best results have been obtained by combining the pyroxylin or its products with substances which will neutralize the free acid remaining in the pyroxylin through imperfect washing or developed in it by decomposition. The mere presence of these neutralizers acts as a deterrent on decomposition. The number of neutralizing agents is small, as many substances which have been supposed to possess this power have been discarded because of defective action.

It is the object of the present invention to extend the list of neutralizing substances for pyroxylin and its products.

My improvements are based on the discovery that the salts of hypophosphorous acid are efficient neutralizing or preserving agents for this purpose. They are well-known chemical substances formed by combining the various bases with hypophosphorous acid.

While all of the hypophosphite salts possess more or less antacid power in connection with pyroxylin, I prefer the hypophosphite of sodium as superior in its effects to all the others, especially as it can be so used as to form transparent products or those which will allow the free transmission of light.

Among the other hypophosphites with which I have experimented are those of ammonium, calcium, magnesium, aluminium, potassium, and zinc. Where transparency is not specially desired, the magnesium and potassium salts are useful preservers. The ammonium salt has some tendency to discolor. The calcium, aluminium, and zinc salts are more feeble in preserving power than the others mentioned, and this is peculiar to the hypophosphites of difficult solubility in alcohol. By "hypophosphite salts" I mean any salt formed by uniting hypophosphorous acid with bases, whether metallic or otherwise. While I am not able to explain the reason for the preserving power possessed by these salts, it is nevertheless the fact that basic substances even when saturated with hypophosphorous acid are still capable of preserving pyroxylin and its compounds. I can only state that my experiments have demonstrated that they possess this power. I do find, however, that the nature of the acid radicle present in the salt determines its preserving power. Thus while hypophosphite of potassium preserves pyroxylin against decomposition the sulfite and bisulfite of potassium possess little or no preserving power. Sheets of pyroxylin compounds made with the latter stain metal-polishing plates and easily turn acid. My experiments also show that in the case of salts of acids containing two or more dissimilar acid radicles the preserving action depends on the nature of the acid radicles. Thus a salt containing the radicle of hypophosphorous acid would have some antacid effect even though the other acid radicle or radicles present possessed no power to form antacid salts. Similarly the salts containing two or more bases united to a single acid act as antacids, according to the properties of the constituents. Hence I include in my invention the present series of salts of hypophosphorous acid in pyroxylin compositions of matter whether the salts are simple, compound, mixed, or associated chemically with other salts.

In treating pyroxylin unassociated with solvents I select one of the hypophosphites which is easily soluble in water—say the sodium salt—and saturate the pyroxylin with the solution. I then remove the water by evaporation, which leaves the requisite amount of the salt behind.

In making compounds with pyroxylin and solvents I proceed in the usual manner—that is, for massive compounds or those containing little solvent, like those made in masticating machinery, I either dissolve or mix the hypophosphite salt with the solvent employed and then thoroughly incorporate it by masticating operations, although in mixtures employed for making explosives, where acetone is a very common solvent, I would advise the use of sufficient high-grade wood spirit to dissolve the antacid salt before it is added to the compounds. This insures a more intimate contact with every portion of pyroxylin. In compounds of a more fluid nature I prefer to use a salt which is easily soluble in alcohol or wood spirit. The sodium hypophosphite can be introduced into solutions in this way, as it is readily soluble in that menstruum. As to proportions, I get the best results when using from one and one-half per cent. to two per cent. of the salt to the pyroxylin, although I do not confine myself to these proportions. In using the sodium hypophosphite there is a remarkable exhibition of the influence of proportion on the transparency. One per cent., while an efficient antacid, interferes more or less with the transparency. The compound is much clearer or more transparent when the preferred proportions are used. This is contrary to the usual experience, because the cloudiness of a compound generally increases along with the increase in the proportion of the antacid. I have made quite a number of mixtures with different proportions of sodium hypophosphite, using both grain-alcohol and wood spirit, and have found this apparently contradictory result in every case. Two per cent. gives the best results. To insure transparency, the solution of sodium hypophosphite should be filtered to remove impurities. Sodium hypophosphite is superior to urea, which has been used to a large extent for these same purposes. This is shown especially in thin sheets. The material containing it remains paler under severe treatment than the urea material, and the by-products, whatever they are, resulting from the reaction between the preserving substance and the pyroxylin do not stain metal, as is liable to be the case with urea compositions. The sodium-hypophosphite products are also less adhesive than those containing urea.

While I have successfully used the hypophosphite salts, and especially sodium hypophosphite, in making pyroxylin compounds stable, I wish to call the attention of the operator to the danger which is said to attend the use of hypophosphite of sodium and hypophosphite of potassium. If this danger really exists, it might also be true of all of the hypophosphite salts, and thus render it necessary to be extremely careful in manipulating them. The *United States Dispensatory* of 1883, in speaking of the aqueous solution of the hypophosphite of potassium, says: "The heat employed in the evaporation should be kept considerably below 100° centigrade (212° Fahrenheit) for fear of explosion. On triturating or heating the salt with an oxidizing agent the mixture will explode." Again, in speaking of sodium hypophosphite, on page 1,329 of the same book, it is stated that: "Sometimes the hypophosphite of sodium explodes with violence during the evaporation of its solution. This was ascribed to the use of too high a heat; but the same accident has occurred when the heat was applied by means of a water-bath. (See A. J. P., 1860, p. 87.) In a communication of Mr. Tuson to the *Chemical News*, (No. 31, p. 46,) it is stated that though he had superintended the manufacture of large quantities of the hypophosphite of calcium and of sodium he had never witnessed anything like an explosion; but the heat employed in evaporation had never approached 100° centigrade (212° Fahrenheit) and this is probably the true explanation. Caution, therefore, should be observed to evaporate at a low temperature. On triturating or heating the salt with an oxidizing agent the mixure will explode."

I have made solutions of the hypophosphite of sodium by heating the salt with wood-spirit. I have used this solution as part of the solvent in making pyroxylin products for rolling. I have masticated the compounds in warm rolls and afterward pressed them under heat into blocks from which sheets were cut. These sheets were seasoned in the usual way by hanging them in the air in warm rooms, and when dry they were pressed between hot plates in order to polish the surfaces. I have subjected these seasoned sheets containing the hypophosphite of sodium and also sheets containing the other hypophosphites mentioned to heat representing from sixty pounds to seventy pounds of steam-pressure. I have continued this as long as fifteen minutes and in no case have I had any explosion; but the operator should keep in view these statements as to the danger involved, and for this reason I would recommend that in making the solutions and at least in the preliminary manipulation of the products the heat be kept down to as low a temperature as possible. The cause of the accidents reported still seems to be a mystery.

Having fully instructed the operator in this invention, what I claim, and desire to secure by Letters Patent, is—

1. A new composition of matter consisting of pyroxylin and a salt of hypophosphorous acid, substantially as described.

2. A new composition of matter consisting of pyroxylin, a solvent of the same, and a salt of hypophosphorous acid, substantially as described.

3. A new transparent composition of matter containing pyroxylin and hypophosphite of sodium.

JOHN H. STEVENS.

Witnesses:
ABRAHAM MANNERS,
GEORGE W. DOWNS.